United States Patent
Pei et al.

(10) Patent No.: US 9,891,110 B1
(45) Date of Patent: Feb. 13, 2018

(54) SYSTEM INCLUDING DISTANCE SENSOR FOR NON-CONTACT TEMPERATURE SENSING

(71) Applicant: Maxim Integrated Products, Inc., San Jose, CA (US)

(72) Inventors: Cheng-Wei Pei, Belmont, CA (US); Arvin Emadi, Santa Clara, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 375 days.

(21) Appl. No.: 14/669,335

(22) Filed: Mar. 26, 2015

Related U.S. Application Data

(60) Provisional application No. 62/034,314, filed on Aug. 7, 2014.

(51) Int. Cl.
*G01J 5/02* (2006.01)

(52) U.S. Cl.
CPC .................................. *G01J 5/0275* (2013.01)

(58) Field of Classification Search
CPC ........ G01J 5/0275; G01J 5/0859; G01J 5/089; G01J 1/0266; G01J 2001/063
See application file for complete search history.

(56) References Cited

U.S. PATENT DOCUMENTS

| | | | | |
|---|---|---|---|---|
| 5,868,496 A * | 2/1999 | Spitzberg | ............... | G01J 5/0003 250/339.04 |
| 6,299,346 B1 * | 10/2001 | Ish-Shalom | ........... | G01J 5/0003 374/126 |
| 6,358,216 B1 * | 3/2002 | Kraus | .................. | A61B 5/6844 374/E13.003 |
| 6,371,925 B1 * | 4/2002 | Imai | .......................... | G01J 5/02 374/E13.003 |
| 2005/0252062 A1 * | 11/2005 | Scrogin | ..................... | F41G 1/38 42/119 |
| 2007/0085157 A1 * | 4/2007 | Fadell | ................... | G06F 3/0304 257/428 |
| 2007/0087311 A1 * | 4/2007 | Garvey, III | ............... | G01J 5/00 434/21 |
| 2007/0118324 A1 * | 5/2007 | Gulati | ................... | G01J 5/0003 702/131 |
| 2007/0182528 A1 * | 8/2007 | Breed | .................... | B60Q 9/008 340/435 |
| 2009/0182526 A1 * | 7/2009 | Quinn | ................... | G01J 5/0003 702/131 |
| 2012/0218418 A1 * | 8/2012 | Strandemar | ............... | G01J 5/02 348/164 |

(Continued)

*Primary Examiner* — Lisa Caputo
*Assistant Examiner* — Philip Cotey
(74) *Attorney, Agent, or Firm* — Advent, LLP

(57) ABSTRACT

A system includes a temperature sensor and a distance sensor. The distance sensor provides an indication of distance between the temperature sensor and an object to be measured. By determining the distance between the temperature sensor and the object, the system determines whether the object is sufficiently close to the temperature sensor to make an accurate temperature measurement, such as by determining whether the object completely fills the field of view of the sensor. In an implementation, the distance sensor includes a light source and a photodetector configured to detect light having wavelengths that correspond to those generated by the light source.

19 Claims, 4 Drawing Sheets

(56) References Cited

U.S. PATENT DOCUMENTS

| | | | | |
|---|---|---|---|---|
| 2012/0307046 A1* | 12/2012 | Lundberg | .............. | G01J 5/0022 348/135 |
| 2013/0214166 A1* | 8/2013 | Barlow | .................... | G01S 5/16 250/342 |
| 2013/0278226 A1* | 10/2013 | Cong | ...................... | H02J 7/007 320/150 |
| 2014/0090948 A1* | 4/2014 | Krishnarao | ............ | B27G 19/02 192/130 |
| 2014/0152970 A1* | 6/2014 | Wada | .................. | A61B 5/1076 356/3 |
| 2014/0160299 A1* | 6/2014 | Mumaw | ................... | H04N 5/33 348/164 |
| 2014/0176725 A1* | 6/2014 | Stuart | ..................... | G01J 5/025 348/164 |
| 2014/0203629 A1* | 7/2014 | Hoffman | ............... | G01J 5/0022 307/9.1 |

\* cited by examiner

SYSTEM INCLUDING DISTANCE SENSOR FOR NON-CONTACT TEMPERATURE SENSING

CROSS-REFERENCE TO RELATED APPLICATIONS

The present application claims the benefit under 35 U.S.C. § 119(e) of U.S. Provisional Application Ser. No. 62/034,314, entitled SYSTEM INCLUDING DISTANCE SENSOR FOR NON-CONTACT TEMPERATURE SENSING, filed Aug. 7, 2014. U.S. Provisional Application Ser. No. 62/034,314 is hereby incorporated by reference in its entirety.

BACKGROUND

Electronic devices, such as smart phones, tablet computers, digital media players, and so forth, increasingly employ sensors to control the manipulation of a variety of functions provided by the device. For example, sensors can be used by electronic devices to detect ambient lighting conditions in order to control the brightness of the device's display screen. Additionally, sensors may be used to detect heat, sound, energy, magnetic fields, etc. Sensors can convert received information into an electrical signal (e.g., a current or voltage). For example, a thermopile is an electronic device that converts thermal energy into electrical energy. A thermopile can include several thermocouples coupled together. Thermopiles are used to provide a electrical output in response to temperature as part of a temperature measuring device, such as an infrared thermometer, used to measure the temperature of an object.

SUMMARY

A system includes a temperature sensor and a distance sensor. The distance sensor provides an indication of distance between the temperature sensor and an object to be measured. By determining the distance between the temperature sensor and the object, the system determines whether the object is sufficiently close to the temperature sensor to make an accurate temperature measurement, such as by determining whether the object completely fills the field of view of the sensor. In an implementation, the distance sensor includes a light source and a photodetector configured to detect light having wavelengths that correspond to those generated by the light source.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

DETAILED DESCRIPTION

Overview

Figure 1A:
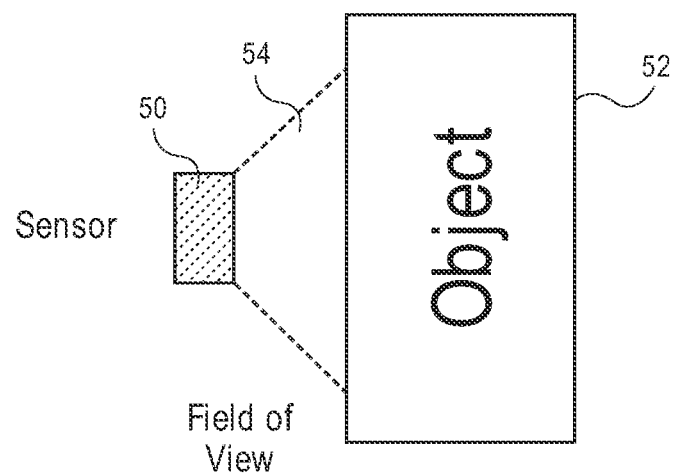
FIG. 1A is a schematic illustration of a non-contact temperature sensor having an object filling the field of view of the sensor.

Non-contact thermometers can be utilized in industrial, medical, and consumer medical applications to determine the temperature of an object to be measured, such as a human individual, machinery, and so forth. The non-contact thermometers can utilize a thermopile-based sensor to measure infrared (IR) radiation exchange between the sensor and an object (human body, etc.) to be measured. An object radiates electromagnetic energy with a spectral profile and intensity that is dependent on its absolute temperature. In non-contact thermometers, the temperature of the object is inferred by the amount of radiation that is detected by the sensor within its defined field of view. The field of view of the thermometer can be defined by a mechanical aperture in the device that limits the directions from which radiation is received by the temperature sensor 50. For example, the mechanical aperture can be a hole/opening in a "TO can" package, can be a metal tube surrounding a thermopile, and so forth. As shown in FIG. 1A, a non-contact temperature sensor 50 is positioned proximate to an object 52 to be measured. The temperature sensor 50 has a field of view 54, in which radiation received within the field of view 52 is utilized to determine a temperature. Since the object 52 fills the field of view 52 of the temperature sensor 50, the determined temperature can be inferred to be the temperature of the object 52. The temperature sensor 50 is typically designed to respond to energy within a defined spectral range, which can be optimized for human body temperature or whatever temperature range is appropriate for the detected object(s). Since the temperature sensor 50 infers temperature through the total amount of IR radiation detected, to accurately infer the temperature requires the object 52 to fill the field of view 54 of the temperature sensor 50.

Figure 1B:
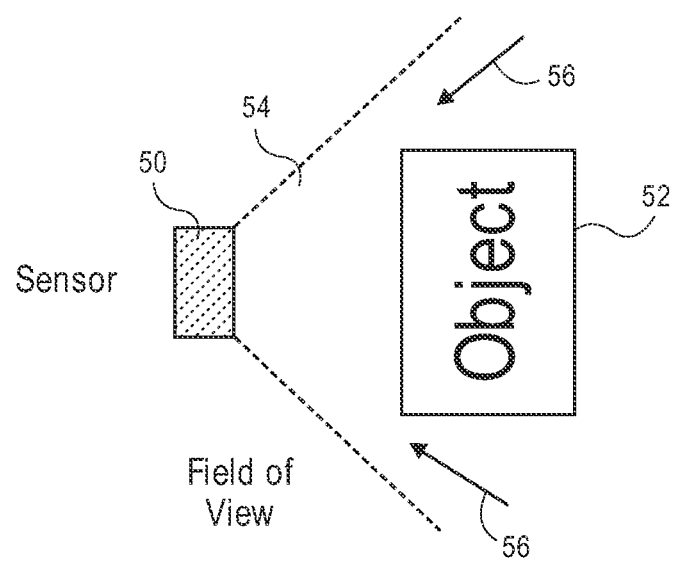
FIG. 1B is a schematic illustration of a non-contact temperature sensor having an object not filling the field of view of the sensor.

When the object does not fill the field of view, the accuracy of the temperature measurement can be negatively affected. For instance, referring to FIG. 1B, the object 52 does not fill the field of view 54 of the temperature sensor 50. Since the field of view 54 extends past the object 52, part of the radiation 56 received by the temperature sensor 50 will be from unknown objects (e.g., objects other than the object 52), from background radiation (e.g., radiation from the environment surrounding the object 52), and so forth. Since the temperature sensor 50 infers the temperature of the object 52 based on the amount of radiation received, when the object does not fill the field of view, the radiation received 56 (e.g., radiation other than the radiation from the object) skews the accuracy of the temperature measurement of the object 52.

Accordingly, a system is described that includes a temperature sensor and a distance sensor, where the distance sensor provides an indication of distance between the temperature sensor and an object to be measured. By determining the distance between the temperature sensor and the object, the system can determine whether the object is sufficiently close to the temperature sensor to make an accurate temperature measurement, such as by determining whether the object completely fills the field of view of the sensor. In an implementation, the distance sensor includes a light source and a photodetector configured to detect light having wavelengths that correspond to those generated by the light source.

Example Implementations

Figure 2:
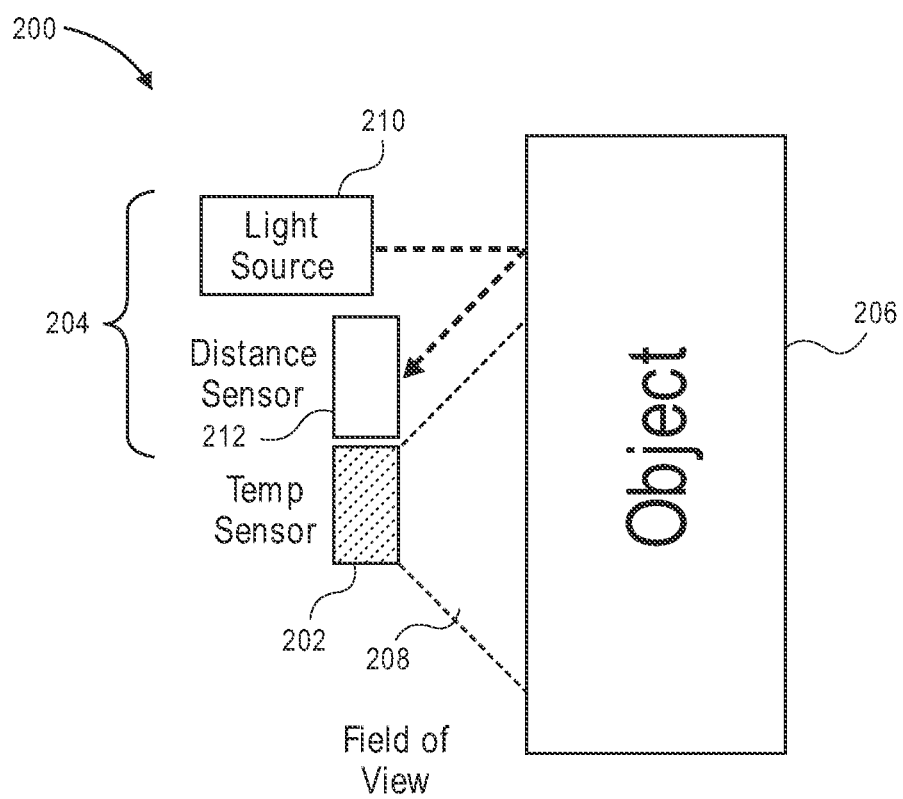
FIG. 2 is a schematic illustration of a system including a non-contact temperature sensor and a distance sensor in accordance with an example implementation of the present disclosure.

Referring to FIG. 2, a system 200 for performing temperature measurements is provided in accordance with an example implementation of the present disclosure. As shown, the system 200 includes a non-contact temperature sensor 202 and a distance sensor 204. The temperature sensor 202 is configured to measure the temperature of an object 206 by receiving and measuring an amount of electromagnetic radiation (e.g., infrared (IR) radiation) within a field of view 208 of the temperature sensor 202. For example, the non-contact temperature sensor 202 can include a thermopile. The distance sensor 204 is configured to infer a distance between the object 206 and the temperature sensor 202. The distance can be utilized to determine whether the object 206 is sufficiently close in proximity to the temperature sensor 202 in order to obtain an accurate temperature measurement by the temperature sensor 202.

The distance sensor generally includes one or more sensors configured to measure or determine a distance from an object to the sensor, and can include an optical camera, light source(s) and photodetector(s), and so forth. In implementations, such as shown in FIG. 2, the distance sensor 204 includes a light source 210 and a photodetector 212. The light source 210 is configured to generate light and to direct the light at an object to be measured by the temperature sensor 202. In implementations, the light source includes one or more light emitting diodes (LED), one or more vertical-cavity surface-emitting lasers (VCSEL), and so forth. The photodetector 212 is configured to detect light originating from the light source 210 that has reflected off of the object 206. In implementations, the photodetector is configured to be sensitive to the particular wavelength(s) of light generated by the light source 210. In implementations, the positions of the light source 210, the photodetector 212, and the temperature sensor 202 relative to each other within the system 200 are known. Accordingly, a measurement of distance by the distance sensor 204 between the object 206 and the distance sensor 204 provides an indication of distance between the object 206 and the temperature sensor 202 used to measure the object 206. In implementations, the distance sensor 204 is utilized to perform other functions that are implemented by mobile electronic devices, such as heart rate monitoring, reflective pulse oximetry, gesture sensing, and so forth.

Figure 3:
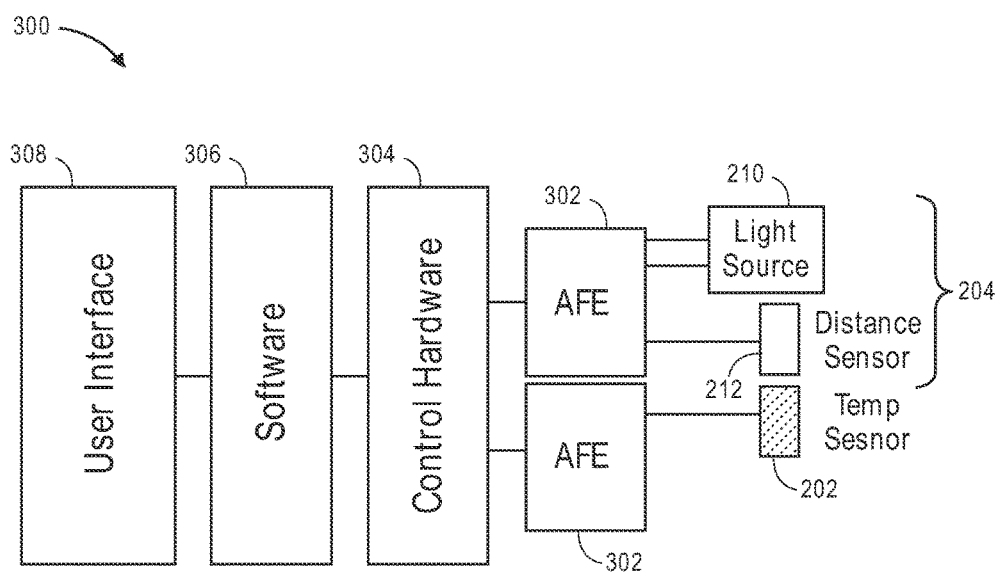
FIG. 3 is a schematic illustration of a system including a non-contact temperature sensor and a distance sensor with associated controls, software, and hardware in accordance with an example implementation of the present disclosure.

Referring to FIG. 3, a system 300 for performing temperature measurements is provided in accordance with an example implementation of the present disclosure. As shown, the system 300 includes temperature sensor 202, distance sensor 204 (shown as including light source 210 and photodetector 212), analog front-ends 302 associated with the temperature sensor 202 and the distance sensor 204, control hardware 304, software 306, and user interface 308. The systems described herein (e.g., systems 200 and 300) can be incorporated by various electronic devices, including but not necessarily limited to: large touch panel products, all-in-one computers, mobile computing devices (e.g., handheld portable computers, Personal Digital Assistants (PDAs), laptop computers, netbook computers, tablet computers, and so forth), mobile telephone devices (e.g., cellular telephones and smartphones), devices that include functionalities associated with smartphones and tablet computers (e.g., phablets), portable game devices, portable media players, multimedia devices, satellite navigation devices (e.g., Global Positioning System (GPS) navigation devices), e-book reader devices (eReaders), Smart Television (TV) devices, surface computing devices (e.g., table top computers), Personal Computer (PC) devices, as well as with other devices that employ touch-based human interfaces.

The analog front-ends 302 generally provide signal conditioning for the inputs to and outputs from the temperature sensor 202 and the distance sensor 204. In implementations the analog front-ends 302 include controllers or drivers configured to facilitate the measurement operations of the temperature sensor 202 and the distance sensor 204, in conjunction with the control hardware 304. The software 306 and the user interface 308 can be included in an end device that houses the temperature sensor 202 and the distance sensor 204, such as, for example, a mobile electronic device. In implementations, the software 306 is stored in a memory of the mobile electronic device.

The memory is an example of tangible computer-readable media that provides storage functionality to store various data associated with operation of device controllers, such as software programs and/or code segments, or other data to instruct a processor and possibly other components of the controller to perform the steps described herein. A wide variety of types and combinations of memory may be employed. The memory may be integral with the processor, may comprise stand-alone memory, or may be a combination of both. The memory may include, but is not necessarily limited to: removable and non-removable memory components, such as Random Access Memory (RAM), Read-Only Memory (ROM), Flash memory (e.g., a Secure Digital (SD) memory card, a mini-SD memory card, and/or a micro-SD memory card), magnetic memory, optical memory, Universal Serial Bus (USB) memory devices, and so forth. In embodiments, the controller and/or memory may include removable Integrated Circuit Card (ICC) memory, such as memory provided by a Subscriber Identity Module (SIM) card, a Universal Subscriber Identity Module (USIM) card, a Universal Integrated Circuit Card (UICC), and so on.

The user interface 308 is configured to provide an interface between the system 300 and a user of the system 300. The user interface 308 can include a display screen, and can be implemented as a touch screen assembly.

In implementations, when the distance sensor 204 takes a distance measurement relative to an object to be measured by the temperature sensor 202, the output from the distance sensor 204 is transferred to the control hardware 304, then to software 306 of the end device. Either the control hardware 304 or the software 306 can control when a temperature measurement is to be made by the temperature sensor 202. For example, in an implementation the control hardware 304 directs the temperature sensor 202 to take a temperature measurement of the object to be measured. In another implementation, the resident software 306 directs the temperature sensor 202 to take a temperature measurement of the object to be measured. The control hardware 304 and the software 306 can direct the activation of the temperature sensor 202 based upon the distance measurement taken by the distance sensor 204. For example, if the distance measured between the distance sensor 204 and the object to be measured (e.g., object 206) is greater than a threshold distance, the control hardware 304 and/or software 306 may be configured to recognize that the object to be measured may not fill the field of view of the temperature sensor. In such occurrences, the control hardware 304 and/or software 306 may not direct the temperature sensor 202 to take a temperature measurement until the distance measured by the distance sensor 204 is within a designated threshold. Alternatively, the distance measurement can be reported via the user interface 308, even though the distance measurement is outside of the threshold, and the user interface 308 can provide an indication that the distance exceeds the threshold (thereby enabling the user to interpret when the temperature measurement may be inaccurate based on the displayed information). The threshold distance is generally selected based on a distance at which one or more objects configured to be measured by the system 300 would fill the field of view of the temperature sensor 202. The threshold distance can differ based on the object to be measured, and can depend on the type of distance sensor 204 used to facilitate the distance measurements. For example, where the distance sensor 204 includes optical reflectance structures (including, but not limited to, a proximity sensor utilizing an LED and corresponding photodiode) the threshold distance can calibrated or adjusted by one or more of the control hardware 304, the software 306, and user input via the user interface 308. In implementations, the threshold distance is adjusted or calibrated on the basis of an emissivity of the target object. For example, the system 300 can store in a memory device a plurality of threshold distances based on various emissivity values for example target objects, such as based on example target classes. In an implementation, the user inputs data to the system 300 via the user interface 308 corresponding to a class of targets, such as a metallic surface, a skin surface, and so forth, whereby the system determines a threshold distance for the object for use in the temperature sensing applications provided herein.

The distance sensor 204 can additionally or alternatively include a camera that is utilized to estimate a distance from the system 300 to the object to be measured. The camera can be a resident camera located on the system 300, such as an optical camera located on a mobile device, such as a mobile computer device, a smartphone, and so forth. In implementations, the system 300 utilizes the camera to detect whether the object to be measured is a living being (e.g., a human/person, an animal, etc.) based upon detection of a pulse signal indicative of heart activity. For example, the system 300 can implement a camera-based heart rate monitor application, such as an application stored in memory to be executed by the system hardware. The camera-based heart rate monitor application can be configured to convert optical measurements of an object into an indication of pulse, heart rate, and so forth. In an implementation, the system 300 includes a mobile heart rate monitor (e.g., a camera-based monitor or another monitor) that is co-located with the temperature sensor 202 in system 300. The mobile heart rate monitor can be used to detect whether the object to be measured is a person based on the detection of a pulse signal. The system 300 can then dictate that a temperature measurement be taken when a pulse signal is measured. Such temperature measurement can be dependent on whether the object is determined to be within the threshold distance, or can be taken regardless of whether the object is within the threshold distance, wherein a message can be provided to the user regarding a potentially inaccurate reading.

In an implementation, the software 306 reports via the user interface 308 when a temperature measurement is likely to be inaccurate. For instance, a processor can execute the software to compare a distance measurement taken by the distance sensor 204 to a threshold value stored in a memory. When the distance measurement exceeds the threshold value, the software can be configured to report that the temperature measurement can be an inaccurate value, since the object measured may not fill the field of view of the temperature sensor 202 (e.g., similar to FIG. 1B). In an implementation, the system 300 prompts the user to bring the system 300 and the object closer in proximity to each other when the distance measurement exceeds the threshold value. The system can be configured to automatically take a temperature measurement when the distance measurement is within the threshold value.

While the distance sensor 204 is shown in FIGS. 2 and 3 as including light source 210 and photodetector 212, other types of distance sensors may be utilized to perform a distance measurement. For example, the distance sensor 204 can include a detector configured to implement an electric field method of detecting an object distance, such as via a capacitive touchscreen, can be configured to implement a Doppler method of detecting an object distance, can be configured to implement a time-of-flight method (e.g., based on optical or radio-frequency signals), and so forth. The distance sensor 204 can be utilized to provide a confidence interval of the temperature measurement by the temperature sensor 202, such as by approximating the level that the object fills the field of view of the temperature sensor 202 based on a comparison between the measured distance and a threshold value stored in memory.

Example Processes

Figure 4:
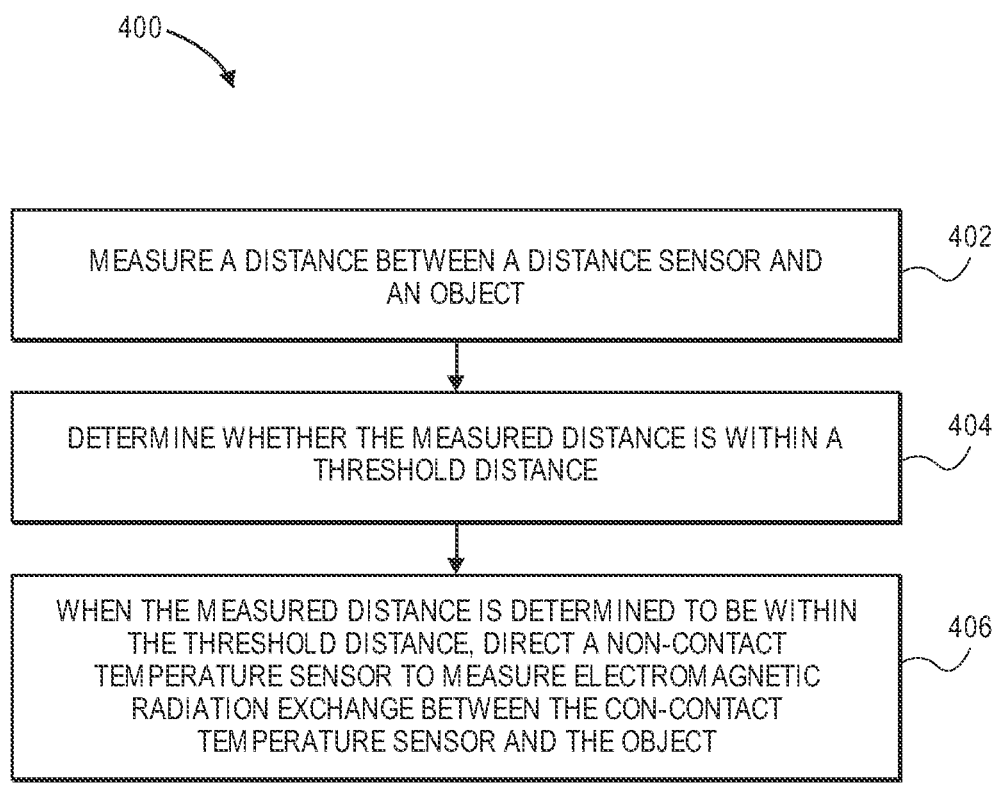
FIG. 4 is a flow diagram of a method for non-contact temperature measurement in accordance with an example implementation of the present disclosure.

FIG. 4 provides a flow diagram illustrating a method 400 in an example implementation for performing non-contact temperature measurements. The method 400 can be implemented by one or more systems described herein (e.g., systems 200 and 300). As shown, method 400 includes measuring a distance between a distance sensor and an object (Block 402). For example, distance sensor 204 can be utilized to measure a distance between object 206 and the distance sensor 204, which can provide an indication of distance between the object and a temperature sensor (e.g., non-contact temperature sensor 202) in order to infer whether the object is within the field of view of the temperature sensor for accuracy of measurement.

Method 400 also includes determining whether the measured distance is within a threshold distance (Block 404). For example, the control hardware 304 and/or software 306 can be configured to determine whether the distance measurements taken by the distance sensor 204 are within a threshold distance. The threshold distance can provide an estimation of whether an object would fill the field of view of a non-contact temperature sensor to provide an accurate temperature measurement of the object by the non-contact temperature sensor. The threshold distance can vary depending on the target object, such as by the emissivity of the target object. Accordingly, the threshold distance can be adjusted to account for differing classes of target objects.

Method 400 further includes directing a non-contact temperature sensor to measure electromagnetic radiation exchange between the non-contact temperature sensor and the object, when the measured distance is determined to be within the threshold distance (Block 406). For example, the control hardware 304 and/or the software 306 can control when a temperature measurement is to be made by the temperature sensor 202 once the distance measured by the distance sensor 204 is determined to be within the threshold value.

Conclusion

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system configured for non-contact temperature measurements, comprising:
   a non-contact temperature sensor configured to measure electromagnetic radiation exchange between the non-contact temperature sensor and an object to be measured;
   a distance sensor configured to measure a distance between the distance sensor and the object to be measured; and
   control circuitry configured to determine whether the distance measured is within a threshold distance, the control circuitry configured to determine the threshold distance responsive to receipt of input of a target class of the object to be measured, the target class associated with a target threshold distance based on an emissivity of the target class.

2. The system as recited in claim 1, wherein the distance sensor includes a light source configured to generate light having a particular spectrum of wavelengths and a photodetector sensitive to the particular spectrum of wavelengths.

3. The system as recited in claim 1, wherein the non-contact temperature sensor includes a thermopile.

4. The system as recited in claim 1, wherein the electromagnetic radiation includes infrared radiation.

5. The system as recited in claim 1, wherein the threshold distance corresponds to a distance determined to provide an accurate temperature measurement from the non-contact temperature sensor based upon a field of view of the non-contact temperature sensor.

6. The system as recited in claim 1, wherein when the distance measured is within the threshold distance, the control circuitry is configured to direct the non-contact temperature sensor to perform a measurement of electromagnetic radiation exchange between the non-contact temperature sensor and the object.

7. The system as recited in claim 1, wherein when the distance measured is not within the threshold distance, the control circuitry is configured to direct the non-contact temperature sensor to perform a measurement and is configured to direct a user interface to display a potential inaccuracy of the measurement of the non-contact temperature sensor.

8. The system as recited in claim 7, wherein the inaccuracy is due to a limitation of the field of view of the non-contact temperature sensor.

9. The system as recited in claim 1, wherein when the distance measured is not within the threshold distance, the control circuitry is configured to direct a user interface to display a request to bring the distance sensor and the object closer in proximity.

10. A method for non-contact temperature measurement, comprising:
    measuring a distance between a distance sensor and an object;
    determining a threshold distance between the object and a non-contact temperature sensor responsive to receipt of input of a target class of the object to be measured, the target class associated with a target threshold distance based on an emissivity of the target class;
    determining whether the measured distance is within the threshold distance; and
    when the measured distance is determined to be within the threshold distance, directing a non-contact temperature sensor to measure electromagnetic radiation exchange between the non-contact temperature sensor and the object.

11. The method as recited in claim 10, wherein the threshold distance corresponds to a distance determined to provide an accurate temperature measurement from the non-contact temperature sensor based upon a field of view of the non-contact temperature sensor.

12. The method as recited in claim 10, further comprising:
    when the distance measured is not within the threshold distance, directing the non-contact temperature sensor to measure electromagnetic radiation exchange between the non-contact temperature sensor and the object; and directing a user interface to display a potential inaccuracy of the measurement of the non-contact temperature sensor.

13. The method as recited in claim 12, wherein the inaccuracy is due to a limitation of the field of view of the non-contact temperature sensor.

14. The method as recited in claim 10, further comprising:
    when the distance measured is not within the threshold distance, directing a user interface to display a request to bring the distance sensor and the object closer in proximity.

15. A system configured for non-contact temperature measurements, comprising:
    a non-contact temperature sensor configured to measure electromagnetic radiation exchange between the non-contact temperature sensor and an object to be measured;
    a distance sensor configured to measure a distance between the distance sensor and the object to be measured, the distance sensor including a camera configured to detect a pulse signal from the object; and
    control circuitry configured to determine whether the distance measured is within a threshold distance, the control circuitry configured to determine the threshold distance responsive to receipt of input of a target class of the object to be measured, the target class associated with a target threshold distance based on an emissivity of the target class.

16. The system as recited in claim 15, wherein when the distance measured is within the threshold distance, the control circuitry is configured to direct the non-contact temperature sensor to perform a measurement of electromagnetic radiation exchange between the non-contact temperature sensor and the object.

17. The system as recited in claim 15, wherein when the distance measured is within the threshold distance and the pulse signal is detected, the control circuitry is configured to direct the non-contact temperature sensor to perform a measurement of electromagnetic radiation exchange between the non-contact temperature sensor and the object.

18. The system as recited in claim 15, wherein when the distance measured is not within the threshold distance, the control circuitry is configured to direct the non-contact temperature sensor to perform a measurement and is configured to direct a user interface to display a potential inaccuracy of the measurement of the non-contact temperature sensor.

19. The system as recited in claim 18, wherein the inaccuracy is due to a limitation of the field of view of the non-contact temperature sensor.

* * * * *